(12) United States Patent
Shin

(10) Patent No.: US 9,274,666 B2
(45) Date of Patent: Mar. 1, 2016

(54) METHOD AND APPARATUS FOR PROVIDING CHATTING SERVICE

(71) Applicant: NHN Corporation, Seongnam-si (KR)

(72) Inventor: JungHo Shin, Seongnam-si (KR)

(73) Assignee: LINE CORPORATION, Tokyo (JP)

( * ) Notice: Subject to any disclaimer, the term of this patent is extended or adjusted under 35 U.S.C. 154(b) by 200 days.

(21) Appl. No.: 13/778,923

(22) Filed: Feb. 27, 2013

(65) Prior Publication Data

US 2013/0227439 A1    Aug. 29, 2013

(30) Foreign Application Priority Data

Feb. 27, 2012    (KR) .................. 10-2012-0019706

(51) Int. Cl.
*G06F 3/00* (2006.01)
*G06F 3/048* (2013.01)
*G06Q 50/00* (2012.01)
*G06Q 10/10* (2012.01)

(52) U.S. Cl.
CPC .............. *G06F 3/048* (2013.01); *G06Q 10/107* (2013.01); *G06Q 50/01* (2013.01)

(58) Field of Classification Search
CPC .................................................. H04L 12/1813
USPC ........................................ 715/751, 758, 759
See application file for complete search history.

(56) References Cited

U.S. PATENT DOCUMENTS

| | | | |
|---|---|---|---|
| 7,921,368 B2 * | 4/2011 | Moody et al. .................. | 715/751 |
| 8,090,776 B2 * | 1/2012 | Torres et al. .................. | 709/206 |
| 8,683,351 B2 * | 3/2014 | Cheng et al. .................. | 715/753 |
| 8,838,712 B2 * | 9/2014 | Nieuwerth ..................... | 709/206 |
| 2004/0078441 A1 * | 4/2004 | Malik et al. .................... | 709/206 |
| 2005/0165880 A1 * | 7/2005 | Moody et al. ................. | 709/200 |
| 2005/0262186 A1 * | 11/2005 | Szeto et al. ..................... | 709/203 |
| 2006/0210034 A1 * | 9/2006 | Beadle et al. ............... | 379/88.22 |
| 2010/0081461 A1 * | 4/2010 | Bothra et al. ................. | 455/466 |
| 2011/0035673 A1 * | 2/2011 | Chou et al. ..................... | 715/739 |
| 2011/0055335 A1 * | 3/2011 | Reilly et al. ................... | 709/206 |
| 2011/0119596 A1 * | 5/2011 | Nesladek et al. ............. | 715/739 |
| 2011/0179126 A1 * | 7/2011 | Wetherell et al. ............ | 709/206 |
| 2012/0011453 A1 * | 1/2012 | Shimono et al. .............. | 715/753 |

(Continued)

FOREIGN PATENT DOCUMENTS

| JP | 2012-018569 | 1/2012 |
|---|---|---|
| KR | 10-2012-0002766 | 1/2012 |

OTHER PUBLICATIONS

Twitter for Dummies. Fitton et al. Published Jul. 7, 2009. Sections 3.1-3.8. Screenshots included.*

(Continued)

*Primary Examiner* — Omar Abdul-Ali
(74) *Attorney, Agent, or Firm* — IPUSA, PLLC

(57) ABSTRACT

An approach is provided to facilitate chatting services. A friend list page is displayed via a user terminal, the friend list page including an area configured to present a status message associated with a friend. A message page is displayed in response to selection of the status message, the message page including a list of status messages associated with the friend. A chat room page is displayed in response to selection of at least one of the listed status messages, the chat room page being configured to facilitate chatting, the chat room page being displayed including the at least one selected status message automatically inserted into an input area of the chat room page.

43 Claims, 9 Drawing Sheets

(56) References Cited

U.S. PATENT DOCUMENTS

2012/0060105 A1* 3/2012 Brown et al. ................. 715/753
2012/0290952 A1* 11/2012 Paluch ......................... 715/758
2013/0067312 A1* 3/2013 Rose ............................ 715/234

OTHER PUBLICATIONS

Screenshots from twitter.com courtesy of the Wayback Machine. Dated Jan. 6, 2011. http://web.archive.org/web/20110106024901/https://twitter.com/toptweets/favorites http://web.archive.org/web/20110106070514/https://twitter.com/neilhimself.*

Japanese Office Action dated Jan. 7, 2014.

"Usage of Kakao Talk", Kakao Talk official blog., [online] Kakao Japan Corp., Jul. 30, 2011, [retrieved on Dec. 20, 2013], Internet <URL: http://blog.kakao.co.jp/how-to-talk> (Reference 1 is the concise English language explanation of Reference 2).

"Eleventh of Complete understanding of "until now" and "from now" of personal computer & network! Understanding of "now" of Twitter", Windows 100%, Shinyusha. Co., Ltd., Jan. 13, 2011, vol. 14, No. 2, p. 116-121 (Reference 1 is the concise English language explanation of Reference 3).

"Usage of Kakao Talk p. 2", Kakao Talk official blog., [online] Kakao Japan Corp., Jul. 29, 2011, [retrieved on Dec. 24, 2013], Internet <URL: http://blog.kakao.co.jp/how-to-talk/p./2> (Reference 1 is the concise English language explanation of Reference 4).

"Usage of Twitter Twitbird 2 Displaying message list", This is andariel's blog!, [online], Feb. 7, 2010, [retrieved on Dec. 20, 2013], internet <Url: http://andariel.cocolog-nifty.com/blog/2010/02/twitter-twibi-1.html> (Reference 1 is the concise English language explanation of Reference 5).

* cited by examiner

METHOD AND APPARATUS FOR PROVIDING CHATTING SERVICE

CROSS-REFERENCE TO RELATED APPLICATION

This application claims priority from and the benefit of Korean Patent Application No. 10-2012-0019706, filed on Feb. 27, 2012, which is hereby incorporated by reference for all purposes as if fully set forth herein.

BACKGROUND

1. Field

Exemplary embodiments relate to a method and apparatus for providing a chatting service to users.

2. Discussion

With recent developments in electronics and communication technology, a portable terminal, for example, a smart phone is propagating at a rapid pace. Various is technologies for providing a chatting service using a text message in a portable terminal in addition to a fixed terminal, for example, a personal computer (PC), and the like, are being developed.

An example of such a chatting service is disclosed in Korean Patent Application Publication No. 10-2012-0002766, entitled "Using Method for Service of Speech Bubble Service based on Location Information of Portable Mobile, Apparatus and System Thereof," published on Jan. 9, 2012. The publication is directed to performing a small scale messenger function by receiving, from a communication server, status information transmitted by a plurality of portable terminals, and displaying a speech bubble image converted from the status information on a screen.

Such a service may provide a messenger function by displaying status information based on a position between users, using a speech bubble on a screen. However, since only a message recently input by a user may be displayed on a map, provision of a service in a form of a chat room in which a conversation between users is recorded may not be possible.

Due to a characteristic of a portable terminal, a size of an interface for inputting a text message may be relatively small. This may cause frequent occurrences of typographical errors and an inconvenience in inputting a text message. In order to quote a message input by another user or chat about the message, the user typically has to re-input the corresponding message individually.

Therefore, there is a need for an approach that conveniently and efficiently enables users to chat about contents of a message input by another user.

The above information disclosed in this Background section is only for enhancement of understanding of the background of the invention and, therefore, it may contain is information that does not form any part of the prior art nor what the prior art may suggest to a person of ordinary skill in the art.

SUMMARY

Exemplary embodiments provide a method and apparatus to facilitate a chatting service that enables users to a chat about contents of a message input by another user in a more convenient, efficient manner.

Additional aspects will be set forth in the detailed description which follows, and in part, will be apparent from the disclosure, or may be learned by practice of the invention.

According to exemplary embodiments, a method includes: displaying, via a user terminal, a friend list page including an area configured to present a status message associated with a friend; displaying, in response to selection of the status message, a message page including a list of status messages associated with the friend; and displaying, in response to selection of at least one of the listed status messages, a chat room page configured to facilitate chatting, the chat room page being displayed including the at least one selected status message automatically inserted into an input area of the chat room page.

According to exemplary embodiments, a computer-readable storage medium configured to store at least one program including instructions that when executed by at least one processor are configured to cause the at least one processor at least to: display a friend list page including an area configured to present a status message associated with a friend; display, in response to selection of the status message, a message page including a list of status messages associated with the friend; and display, in response to selection of at least one of the listed status messages, a chat room page configured to facilitate chatting, the chat room page being displayed is including the at least one selected status message automatically inserted into an input area of the chat room page.

According to exemplary embodiments, an apparatus includes: at least one processor; and at least one memory including computer code, the at least one memory and the computer code configured to, with the at least one processor, cause the apparatus at least to: display a friend list page including an area configured to present a status message associated with a friend, display, in response to selection of the status message, a message page including a list of status messages associated with the friend, and display, in response to selection of at least one of the listed status messages, a chat room page configured to facilitate, the chat room page being displayed including the at least one selected status message automatically inserted into an input area of the chat room page.

According to exemplary embodiments, an apparatus includes: at least one processor; and at least one memory including computer code, the at least one memory and the computer code configured to, with the at least one processor, cause the apparatus at least to: receive a status message associated with a user of a chat service, determine one or more friends associated with the user, and transmit the status message to one or more user terminals corresponding to the one or more friends. The status message is configured to be: displayed on a friend list page including an area configured to present the status message of the user, displayed, in response to selection of the status message presented via the friend list page, on a message page including a list of status messages associated with the user, and displayed, in response to selection of the status message presented via the message page, in an input area of a chat room page configured to facilitate chatting.

It is to be understood that both the foregoing general description and the is following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
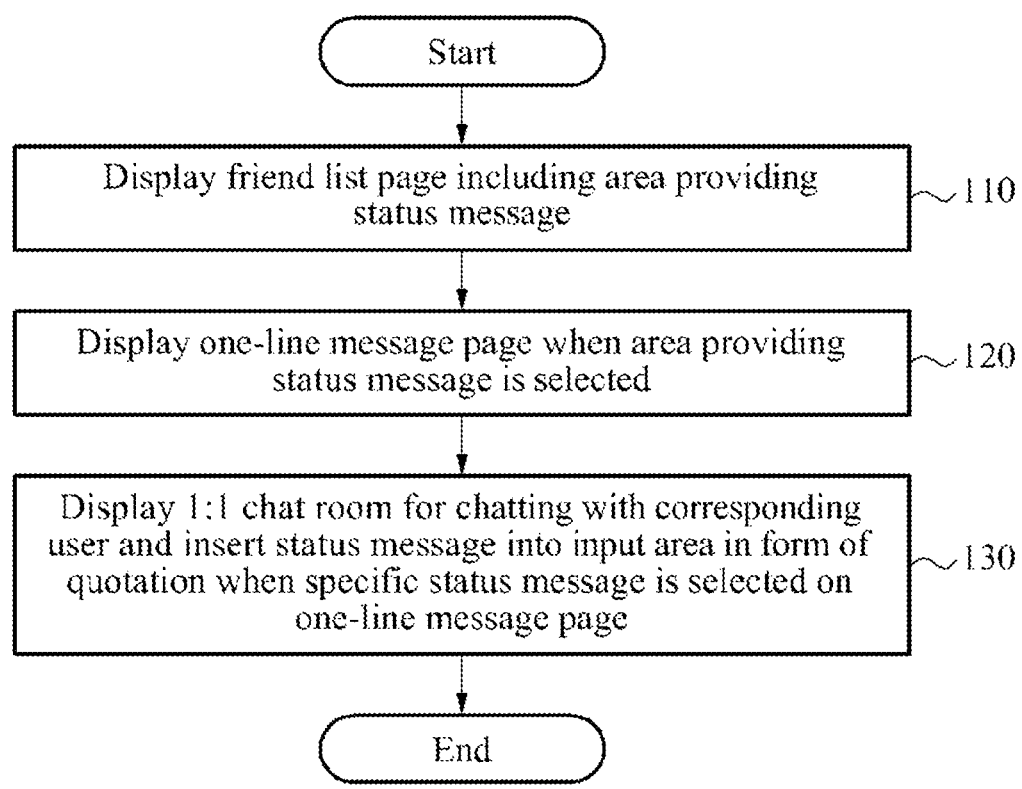
FIG. 1 is a flowchart of a process of providing a chatting service, according to exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, like reference numerals denote like elements.

When an element is referred to as being "connected to" another element, it may be directly connected to the other element, or intervening elements may be present. When, however, an element is referred to as being "directly connected to" another element, there are no intervening elements present. For the purposes of this disclosure, "at least one of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, third, etc., may be used herein to describe various elements, components, regions, layers, and/or sections, these elements, components, regions, layers, and/or sections should not be limited by these terms. These terms are only used is to distinguish one element, component, region, layer, or section from another element, component, region, layer, or section. Thus, a first element, component, region, layer, or section that is discussed below may be termed a second element, component, region, layer, or section without departing from the teachings of the present invention.

Spatially relative terms, such as "beneath," "below," "lower," "above," "upper," and/or the like, may be used herein for descriptive purposes and, thereby, to describe one element or feature's relationship to another element(s) or feature(s) as illustrated in the drawings. Spatially relative terms are intended to encompass different orientations of an apparatus in use or operation in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations) and, as such, the spatially relative descriptors used herein are to be interpreted accordingly.

The terminology used herein is for the purpose of describing particular embodiments only and is not intended to be limiting. As used herein, the singular forms "a," "an," and "the" are intended to include the plural forms as well, unless the context clearly indicates otherwise. Moreover, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to is which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a flowchart of a process of providing a chatting service, according to exemplary embodiments.

Referring to FIG. 1, in operation 110, a user terminal may display, on a screen of the user terminal, a friend list page including an area providing a status message of a user registered as a friend, hereinafter referred to as a friend. Here, the user terminal may correspond to a portable terminal including a touch sensing display.

Figure 3:
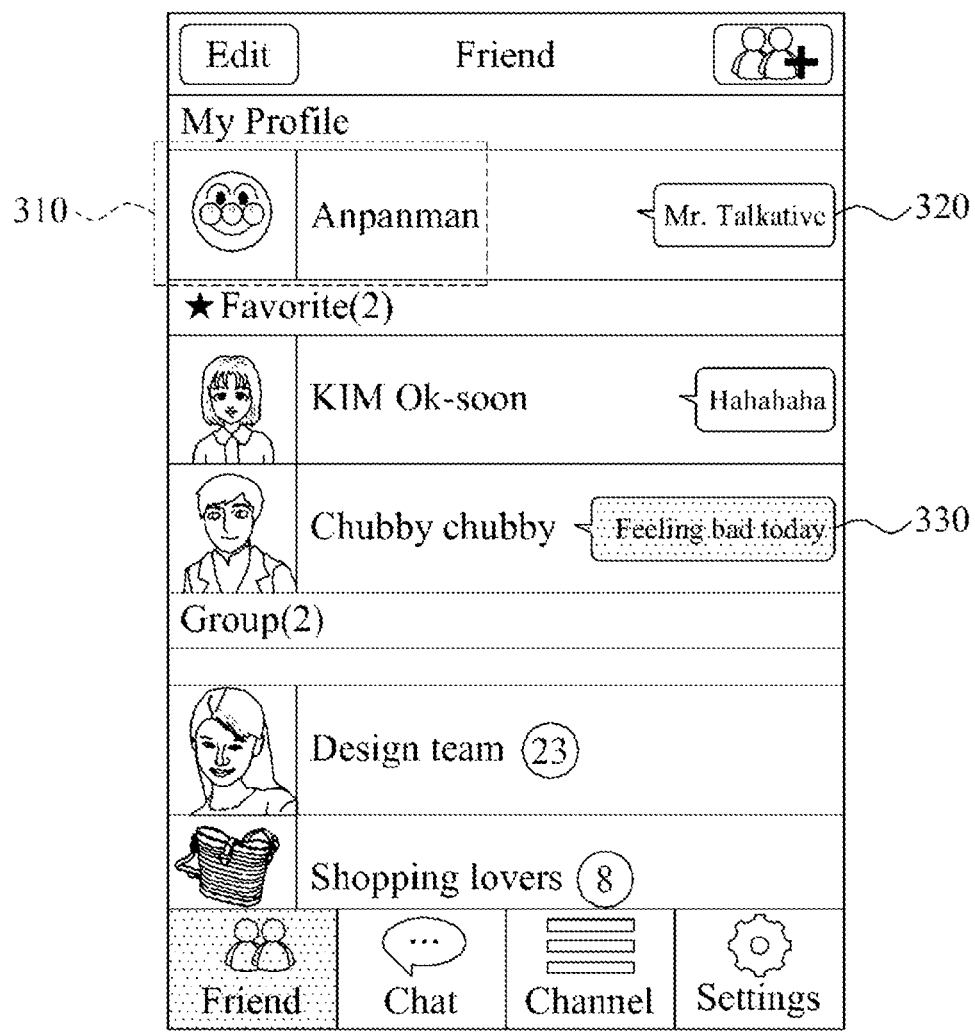
FIG. 3 is a diagram of an illustrative friend list page, according to exemplary embodiments.

While an illustrative friend list page is described in more detail in association with FIG. 3, it is noted that the friend list page may include an area providing a status message, and an area providing profile information of the friend. In this manner, a status message of the friend may be displayed in the area providing the status message, and profile information of the friend may be displayed in the area providing the profile information. A nickname, a thumbnail image of the friend, and the like, may be displayed in the area providing the profile information. Further, the profile information and the status message of the friend, and profile information and a status message of a user of the user terminal may be displayed on the friend list page.

When the area providing the status message is selected on the friend list page, the user terminal may display a message page (e.g., a one or more line message page) providing a list of status messages previously input by the friend, in operation 120. For descriptive purposes, the message page will be hereinafter described in association with a one-line message page. It is contemplated; however, that the message page may be configured to limit the size of messages is based on one or more other parameters, such as character count, word count, and the like. When the area providing the profile information is selected on the friend list page, the user terminal may display a pop-up page (or window) providing detailed profile information of the friend. The detailed profile information may include a nickname, a thumbnail image, a status message of the friend, and the like, as well as any other suitable profile information, e.g., associations, contact information, date of birth, preferences, etc.

Similar to a case in which the area providing the status message of the friend is selected on the friend list page, when a status message of a specific friend is selected on the pop-up page, the user terminal may display a chat room page for chatting with the corresponding friend. To this end, the user terminal may also insert the selected status message into an input area of the chat room page in a form of, for example, a quotation. It is also contemplated that exemplary embodiments enable a user to select the status message of a first friend in association with existing or intended communications with at least one second friend. In this manner, the status message associated with the first friend may be inserted into an input area of a chat room page associated with the user and the at least one second friend. When such functionality is made available, the user may be provided the ability to select (or otherwise specify) where a selected status message is to be inserted as, for instance, a quotation. For example, selection of the status message associated with the first friend may cause, at least in part, a pop-up page (or window) to appear to enable the user to select (or otherwise specify) where the selected status message is to be inserted, e.g., enable the user to select at least one second user to communicate with regarding the selected status message. As such, a pop-up page associated with the user and the at least one selected second user may be provided (or populated) with the status message associated with the first user.

Furthermore, it is contemplated that exemplary embodiments enable one or more status messages to be selected, and thereby, inserted into one or more pop-up pages facilitating communication between the user and the one or more friends associated with the selected status messages. In this manner, a plurality of status messages may be inserted into an input area of one or more chat room pages. When such functionality is made available, one or more multiple selection interfaces (e.g., check boxes, radio buttons, etc.) may be provided alongside displayed status messages to enable users to select multiple status messages. To this end, a global selection interface, e.g., insert button, may be provided to initiate display of a chat room associated with one or more friends, such as a friend correspond to the selected status messages and one or more other friends to which the user is interested in communicating with regarding the selected status messages. Again, selection of the global selection interface may cause, at least in part, a pop-up page to be displayed to enable the user to specify (e.g., select) one or more friends to communicate with regarding the selected status messages. In this manner, one or more chat room pages may be provided in response to the specification of the one or more friends.

Accordingly, for descriptive purposes, exemplary embodiments will be described, hereinafter, in association with a user selecting a status message associated with a friend, such that the selected status message is inserted into an input area of a chat room page associated with the user and the friend.

When one of a plurality of status messages provided on the one-line message page is selected, the user terminal may display a one-to-one (1:1) chat room page for chatting with a corresponding friend, and may insert the selected status message into an input area of the 1:1 chat room page in a form of a quotation, in operation 130. Accordingly, the user terminal may enable the user to chat with the corresponding friend about the message in a more convenient, is efficient manner. To this end, because the above-noted features make it easier, and thereby, less daunting to communicate with friends about their status messages, exemplary embodiments may also foster increased usage and desirability of the chat service. This, in turn, may increase the profitability associated with, for example, advertisement revenue tied to the chat service or any other suitable monetization mechanism associated with the chat service.

According to exemplary embodiments, when the one-line message page corresponds to a one-line message page of the user of the user terminal, an edit icon to edit a status message may be displayed on a side of each status message provided on the one-line message page, and an input area to input the status message may be displayed on a side of the one-line message page for the user to edit status messages previously input by the user. An illustrative message page associated with a friend is described in more detail in association with FIG. 5, whereas an illustrate message page associated with a user of the user terminal is described in more detail in conjunction with FIG. 7.

Figure 2:
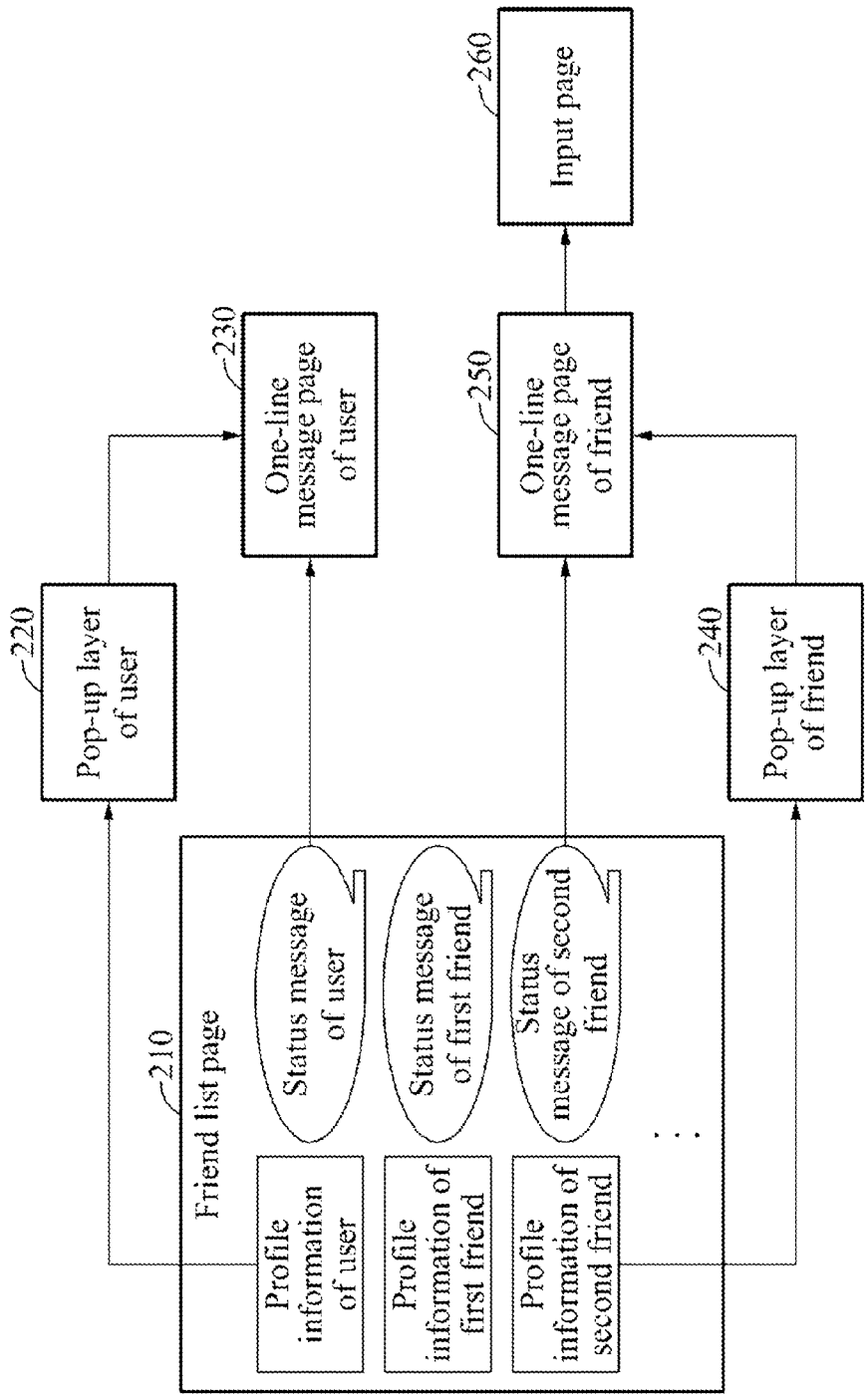
FIG. 2 is an operational flowchart of a process of providing a chatting service, according to exemplary embodiments.

FIG. 2 is an operational flowchart of a process of providing a chatting service, according to exemplary embodiments.

FIG. 2 illustrates various pages of a chatting service provided via a display of a user terminal. Referring to FIG. 2, profile information and a status message of a user of the user terminal may be displayed in an upper portion of a friend list page 210. Profile information and status messages of one or more friends may be displayed in a lower portion of the friend list page 210. It is contemplated; however, that any other suitable configuration may be utilized.

In this instance, when the profile information of the user of the user terminal is selected on the friend list page 210, a pop-up layer 220 of the user of the user terminal may be displayed. When profile information of a friend is selected on the friend list page 210, a pop-up is layer 240 of the friend may be displayed. It is noted that pop-up layers 220 and 240 may be configured to fill a portion or all of the display screen associated with the user terminal. In this manner, pop-up layers 220 and 240 may overlay some or all of friend list page 210. Detailed profile information including, for instance, a nickname, a thumbnail image, a status message of the user of the user terminal, and the like, may be displayed via the pop-up layer 220 associated with the user. Similarly, detailed profile information including, e.g., a nickname, a thumbnail image, a status message of the friend, and the like, may be displayed via the pop-up layer 240 associated with the friend.

When an area providing the status message is selected on the friend list page 210 or on one of the pop-up layers 220 or 240, a one-line message page 230 or 250 may be provided on the screen of the user terminal.

In particular, when an area providing a status message of the user of the user terminal is selected on the friend list page 210 or when a status message displayed via the pop-up layer 220 of the user of the user terminal is selected, the one-line message page 230 corresponding to the user of the user terminal may be displayed. It is noted that the one-line message page 230 may be configured to enable (or otherwise facilitate) users in editing one or more status messages of the user of the user terminal. This is described in more detail in association with FIGS. 3-5. When an area providing a status message of a friend is selected on the friend list page 210 or when a status message displayed via the pop-up layer 240 of the corresponding friend is selected, the one-line message page 250 of the friend providing status messages of the corresponding friend may be displayed. This is described in more detail in association with FIGS. 3, 6, and 7.

When one of a plurality of status messages displayed on the one-line message is page 250 of the friend is selected, an input page 260 for chatting with the friend may be displayed, and the selected status message may be inserted into an input area of the input page 260 in a form of a quotation. This is described in association with FIGS. 7 and 8.

FIG. 3 is a diagram of an illustrative friend list page, according to exemplary embodiments.

According to exemplary embodiments, the friend list page may include a friend tab configured to display information of friends, a chat tab configured to display chat rooms for chatting with the friends, as well as one or more other tabs, such as a channel tab, a settings tab, and the like. As seen in FIG. 3, an illustrative example of selecting the friend tab on the friend list page is illustrated, and thereby, configured to display information associated with the user of the user terminal and one or more friends of the user of the user terminal.

When the friend tab is selected, an area 310 providing profile information of a user and an area 320 providing a status message of the user may be displayed in an upper portion of the friend list page. An area providing profile information of a friend and an area 330 providing a status message of the friend may be displayed in a lower portion of the friend list page.

In exemplary embodiments, a "most recently" updated status message may be displayed in a form of a speech bubble in, for instance, areas 320 and 330 respectively displaying the status message associated with the user of the user terminal and a friend of the user terminal. In this instance, when a number of characters used in a status message exceed a predetermined number of characters, for example, 20 characters, an ellipsis may be displayed to indicate a surplus portion of the status message. In this manner, the user of the user terminal may be permitted to see the surplus portion of the status message via a hovering interaction associated with the status message. For instance, the user may hover a pointer or other interactive tool (e.g., finger) over the status message to cause, for instance, the status message to scroll through the surplus portion. As another example, an initial selection of the status message may cause the status message to scroll through the surplus portion. As such, an additional selection of the status message may be configured to cause the display of a one-line message page, as is described in more detail below.

When it is determined that a status message displayed on the friend list page has yet to be read by the user, the status message may be displayed using a color differing from a color for a case when it is determined that the status message has been read by the user. As an example, when it is determined that a status message of a corresponding friend has been updated after a previous visit of the user to a one-line message page of the corresponding friend, the user terminal may indicate that the status message has been updated by changing a color of the area 330 providing the status message of the corresponding friend to a predetermined color, for example, from white to yellow.

In FIG. 3, a number indicated on a side of "Design team" or "Shopping lovers" may indicate a number of users participating in a corresponding chat room. Further, a number indicated on a side of "Favorite" or "Group" may indicated a number of users categorized in a corresponding group of friends by the user of the user terminal. In this manner, interaction with headings, such as "Favorite," "Group," "Design team," "Shopping lovers," and the like, may be configured to maximize or minimize the display of users associated with such groups or chat rooms. Moreover, an "Edit" interface element may be provided to enable users to customize one or more display features associated with the friend list page, as well as enable users to customize sorting of friends in groups, such as "Favorite," "Group," etc., or any other user-defined group. To this end, the friend list page may also include an "Add friend" interface element configured to enable users to add new friends to the friend list page. As seen in FIG. 3, the "Add friend" interface element may be conveyed as an illustrative depiction of multiple users with a plus sign.

Figure 4:
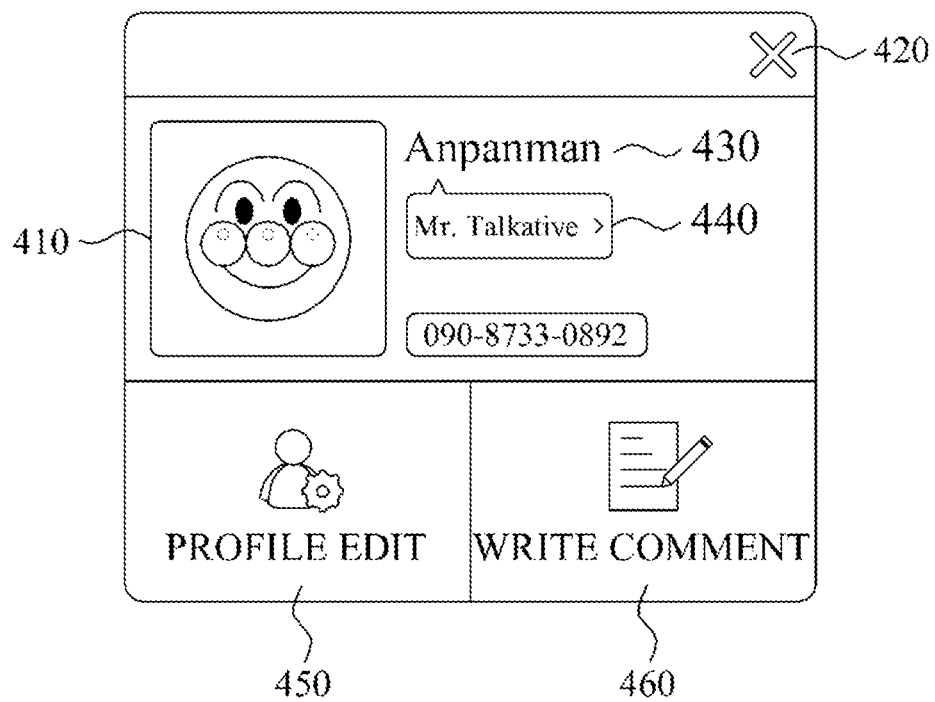
FIG. 4 is a diagram of an illustrative profile pop-up page corresponding to a user of a user terminal, according to exemplary embodiments.

FIG. 4 is a diagram of an illustrative profile pop-up page corresponding to a user of a user terminal, according to exemplary embodiments.

As previously described, detailed profile information of the user may be displayed via a profile pop-up page of the user of the user terminal, such as the pop-up layer 220 of FIG. 2. As an example, the profile pop-up page of the user may include an area 410 providing a profile photo, avatar, etc., of the user in a form of a thumbnail image, a button 420 to close the pop-up page, an area 430 providing a name, nickname, moniker, etc., of the user, an area 440 providing a status message of the user, an area 450 linking to a page for editing profile information of the user, and an area 460 linking to a one-line message page of the user. It is noted that interaction with one or more of these areas may be configured to cause one or more other pop-up layers or pages to be displayed, as will become more apparent below.

When the area 410 is selected, an original image of the thumbnail image displayed in the area 410 may be displayed. In this manner, a pop-up layer including the original image may further include one or more interactive components to enable users to modify the original image and/or selected (or otherwise upload) a new original image to be utilized in association with their profile. When the area 440 is selected, the user may be able to access a one-line message page of the user of the user terminal, such as described in association with FIG. 5. Interaction with area 450 may be configured to cause a pop-up layer to be displayed to enable even more detailed profile information of the user to be viewed and/or edited by the user of the user terminal.

As with interactions associated with area 440, interaction with area 460 may also be configured to cause a message page to be displayed. Additionally or alternatively, interaction with area 460 may be configured to cause another pop-up layer to be displayed that enables users to add comments to their profile. For instance, area 460 may be linked to a diary/journaling pop-up layer configured to enable users to record information therein. To this end, such information recorded via the diary/journaling pop-up layer may be analyzed and, thereby, utilized to generate a status message for presentation in association with the user of the user terminal, e.g., presentation via area 440, in association with one or more friend list pages, etc. In this manner, users may be able to convey their feelings in a more grandiose manner, such that a brief summary may be generated to utilize in association with a status message. The brief summary may be generated based on extraction of keywords/phrases from a diary/journaling entry that are subsequently analyzed and/or utilized for the status message. It is further noted that the user of the user terminal may be provided an opportunity to accept or reject the generated status message before posting in association with the profile of the user.

Figure 5:
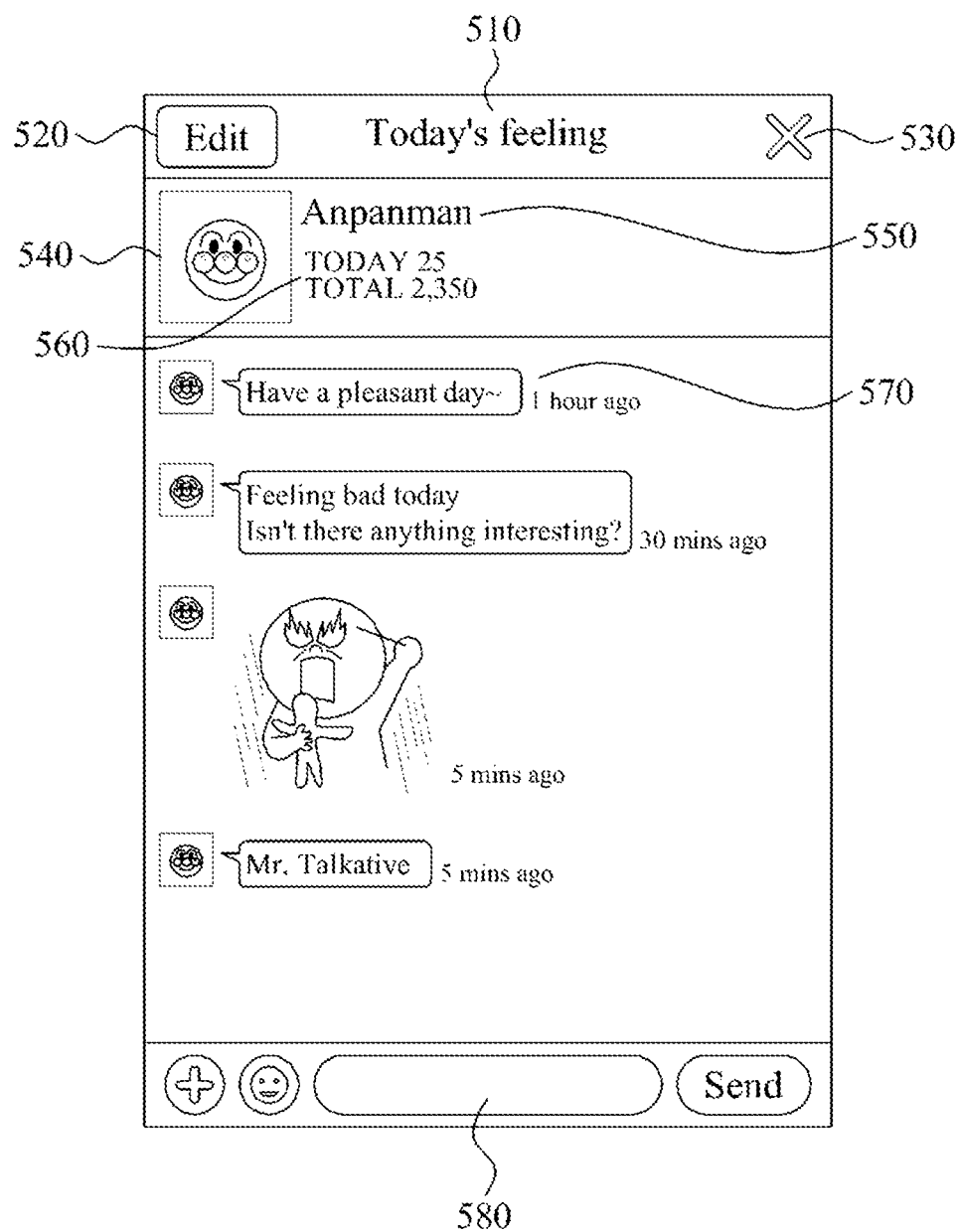
FIG. 5 is a diagram of an illustrative message page corresponding to a user of a user terminal, according to exemplary embodiments.

FIG. 5 is a diagram of an illustrative message page corresponding to a user of a user terminal, according to exemplary embodiments. As previously mentioned, the message page of FIG. 5 may be a one-line message page and may be configured to be displayed in response to interaction with status message 320 of FIG. 3, interaction with status message 440 of FIG. 4, interaction with area 460 of FIG. 4, and the like.

Referring to FIG. 5, a one-line title 510 (e.g., "Today's feeling") that may be edited by the user may be displayed on a top region of the one-line message page. An edit button 520 may be disposed on a left side of an area displaying the one-line title 510. When the edit button 520 is selected, an edit icon for editing or deleting a corresponding status message may be is displayed on a side of each status message. A button 530 to close the one-line message page may be disposed on a right side of the area displaying the one-line title 510.

A profile photo 540 of the user, a name 550 of the user, and a page view counter 560 may be displayed below the area displaying the one-line title 510. The page view counter 560 may count a number of visits of other users (e.g., friends) to the one-line message page of the user, and may count and display, for example, a number of visitors today, a total number of visitors since the one-line message page was initiated, and the like. According to exemplary embodiments, interaction with the "Edit" button 520 may enable users to adjust the granularity of the various counters 560, as well as enable the display other information in place of counters 560, such as total number of status messages input via the one-line message page, etc.

All items typically used in a chat room, for example, a text, an emoticon, an image, positional information, and the like, may be used in a status message 570. A time and/or date at which a corresponding status message is input may be displayed beside the status message 570. As an example, when the corresponding message was input less than an hour ago, the time at which the corresponding message is input may be displayed as "n" minutes ago. When the corresponding message was input more than an hour, but less than 24 hours ago, the time at which the corresponding message is input may be displayed as "n" hours ago. When the corresponding message was input more than 24 hours ago, the time at which the corresponding message input may be displayed as "n" days ago. It is noted that "n" denotes a natural number. Additionally or alternatively, the time and date when the status message was input may be displayed beside the status message, such as January 1 at 11:22 AM.

As shown in FIG. 5, when the one-line message page corresponds to a one-line message page of the user, an input area 580 may be provided so that the user may input a status message. As will become more apparent below in association with the description associated with FIG. 9, interaction with a "Send" interface element may be utilized to transmit, e.g., upload, the input status message to a corresponding message/chat server corresponding to one or more service providers.

According to exemplary embodiments, even though the message page may be configured as a one-line message page, users may be enabled to enter status messages of greater length than one-line or greater length/size than any other suitable limit. As previously mentioned, such status messages may be partially displayed on corresponding friend list pages in conjunction with an ellipsis to indicate to others that the status message includes additional information.

Figure 6:
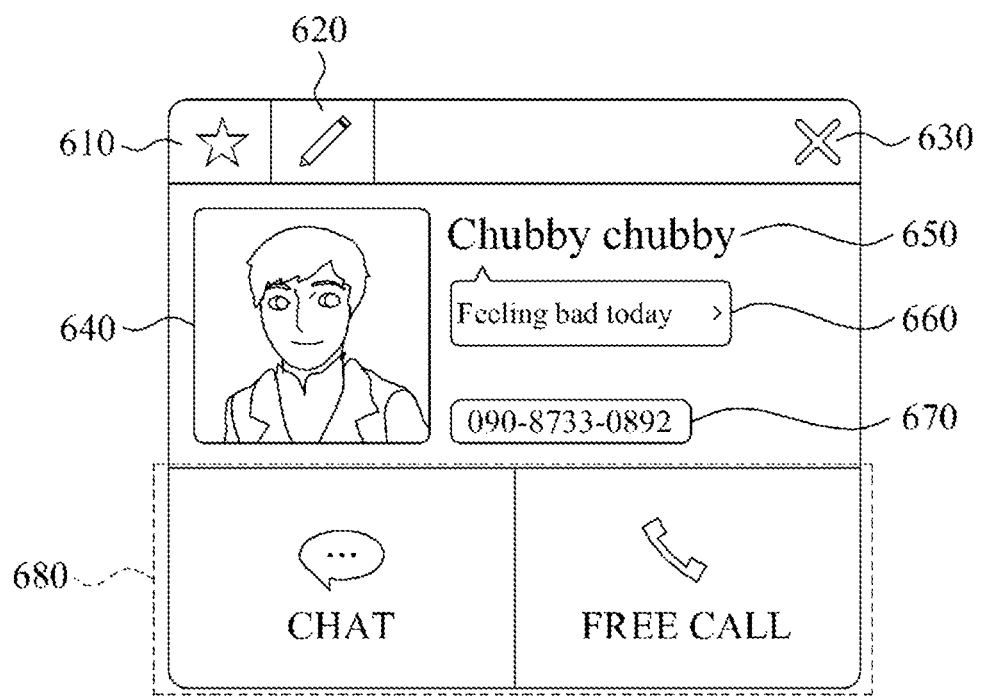
FIG. 6 is a diagram of an illustrative profile pop-up page of a friend, according to exemplary embodiments.

FIG. 6 is a diagram of an illustrative profile pop-up page of a friend, according to exemplary embodiments. As previously mentioned, the presentation of the pop-up page of FIG. 6 may be provided in response to interaction with, for instance, user profile information of the friend displayed in association with a friend list page.

According to exemplary embodiments, detailed profile information of the friend may be displayed via the profile pop-up page of the friend, such as the pop-up layer 230 of FIG. 2. For example, as shown in FIG. 6, the profile pop-up page of the friend may include a favorite button 610 to add the friend to a "Favorites" group of friends, a button 620 to edit a name, nickname, moniker, etc., of the friend, a button 630 to close the profile pop-up page of the friend, a thumbnail image 640 of the friend, an area displaying a name, nickname, moniker, etc., 650 of the friend, a status message 660, and a phone number (or other contact information) 670 of the friend, an area 680 to perform a free call and/or a 1:1 chat with the friend, and the like. It is also noted that the edit button 620 may be utilized to customize the presentation of or information is displayed via areas 640, 650, 660, and/or 670. To this end, modifications input by the user of the user terminal may be limited to affecting the presentation of the profile pop-up page of the friend on the user terminal, such that the profile pop-up page will be presented on other user terminals as configured by the friend. Accordingly, the friend associated with the profile-pop up page may be enabled to limit the extent and duration of changes capable of being imposed by the user of the user terminal. For instance, the friend may limit area 670 to only be capable of presenting a telephone number or an email address of the friend. As another example, the friend may be enabled to prevent the user of the user terminal from editing the name presented in area 650. Furthermore, the friend may be enabled to provide settings, such that the modifications imposed by the user of the user terminal revert to their original settings after the duration of a predetermined period of time.

The favorite button 610 may be configured as a toggle button. That is, when the favorite button 610 is selected once, the friend may be added to a list of "Favorite" friends. As such, when the favorite button 610 is selected again, the friend may be deleted from the list of "Favorite" friends.

When a name is edited using the button 620, the edited information may be stored in a user terminal, irrespective of a nickname stored in a server, a name stored in contacts, and the like.

When the thumbnail image 640 is selected, an original image of the corresponding image may be displayed. The user may also be presented with one or more interface elements to enable the thumbnail image 640 to be edited or replaced with one or more other thumbnail images.

When the status message 660 is selected, a one-line message page of the friend is may be displayed.

The phone number 670 may be displayed when the friend is added based on contacts or may be retrieved (e.g., "pulled") from a networked repository by the user terminal once the friend is added or in response to a corresponding request. To this end, the phone number and/or other user profile information may be "pushed" to the user terminal based on one or more settings provided by the friend. These setting(s) may be stored in a networked repository utilized to manage one or more features of the status message/chat service of the one or more service providers. In a case of an identical country between the user of the user terminal and the friend, a country code may be excluded. When the phone number 670 is selected, a typical call function may be utilized to initiate, e.g., a voice and/or video communication between the user of the user terminal and the corresponding friend.

Figure 7:
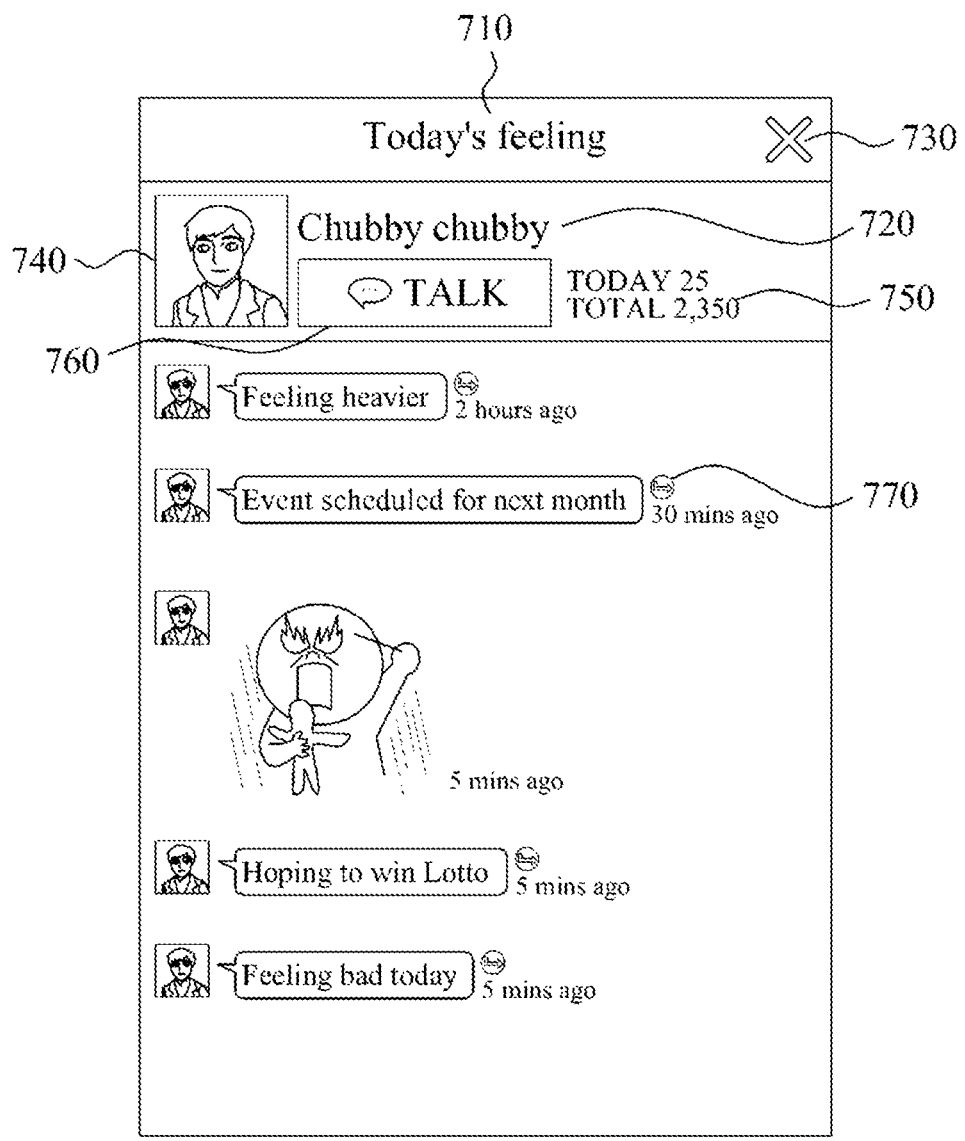
FIG. 7 is a diagram of an illustrative message page of a friend, according to exemplary embodiments.

FIG. 7 is a diagram of a message page of a friend, according to exemplary embodiments. As previously mentioned, the message page of FIG. 7 may be a one-line message page and may be configured to be displayed in response to interaction with status message 330 of FIG. 3, interaction with status message 660 of FIG. 6, interaction with a "Chat" option provided via area 680 of FIG. 6, and the like.

Referring to FIG. 7, similar to the illustrative message page of a user of a user terminal depicted in FIG. 5, a one-line title 710 (e.g., "Today's feeling") that may be edited by the friend may be displayed on a top portion of the one-line message page of the friend. A button 730 to close the one-line message page of the friend may be disposed on a right side of an area displaying the one-line title 710.

A name 720 of the friend, a profile photo 740 of the friend, a page view counter 750, and a button 760 to initiate a 1:1 chat room page for chatting with the friend may be is displayed below the area displaying the one-line title 710.

According to exemplary embodiments, an icon 770 to initiate a 1:1 chat room page for chatting with the friend with a corresponding status message input into an input area of the 1:1 chat room may be displayed beside each corresponding status message displayed via the one-line message page of the friend. In addition, similar to the one-line message page of the user, a time at which the corresponding status message is input may be displayed beside each status message.

Figure 8:
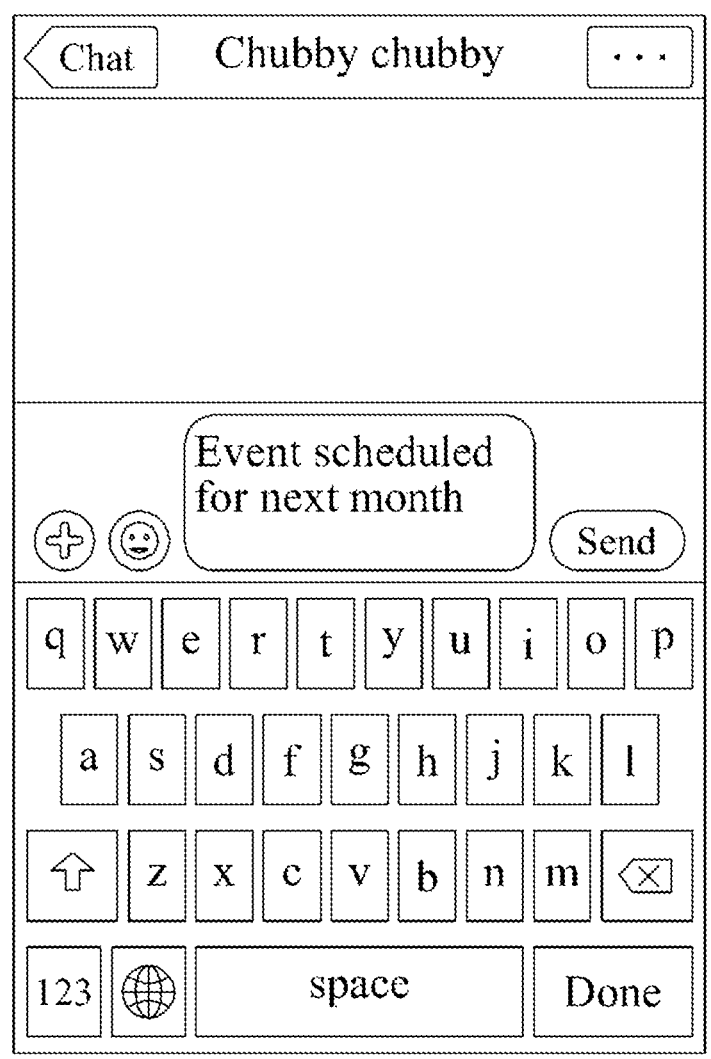
FIG. 8 is a diagram of an illustrative chat room page, according to exemplary is embodiments.

FIG. 8 is a diagram of an illustrative chat room page, according to exemplary embodiments.

When a status message displayed on a friend list page, a profile pop-up page of a friend, a one-line message page of the friend, and the like is selected, a user terminal may display a chat room page for chatting with the friend. In addition, the user terminal may also insert the selected status message into an input area of the chat room page in a form of a quotation. Likewise, in response to detecting interaction with an icon 770, the user terminal may be configured to further insert the status message associated with the icon 770 into an input area of the chat room page. Accordingly, the user may chat about contents of the status message input by the friend, in a more convenient manner, without a necessity arising to manually input the corresponding status message.

Figure 9:
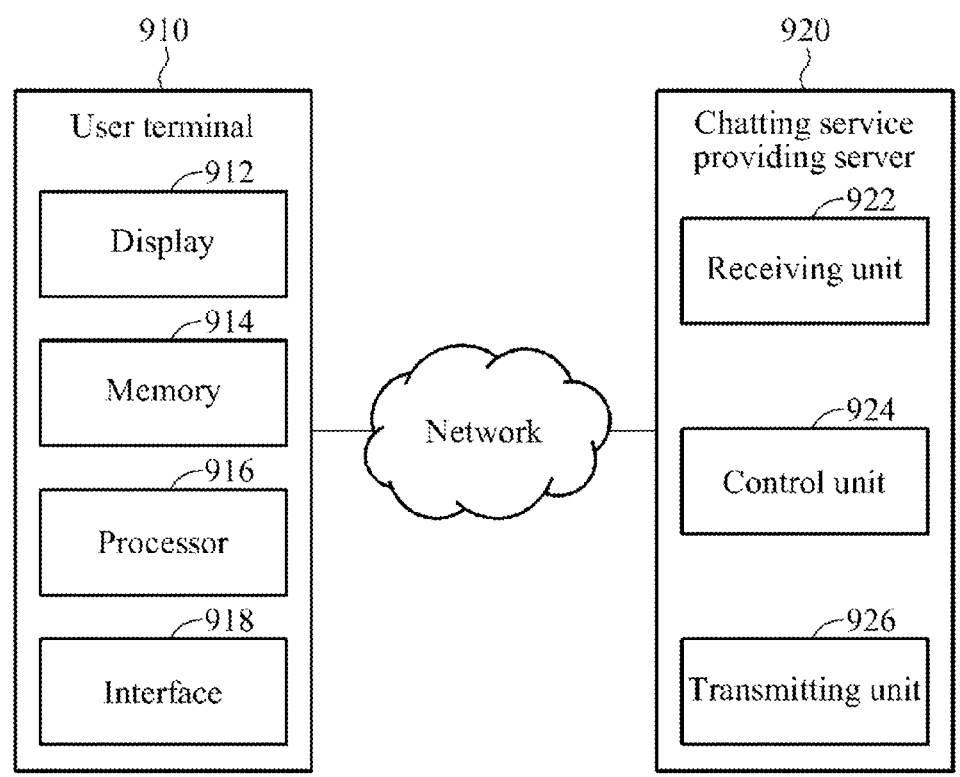
FIG. 9 is a block diagram of an apparatus configured to provide a chatting service, according to exemplary embodiments.

FIG. 9 is a block diagram of an apparatus configured to provide a chatting service, according to exemplary embodiments.

A user terminal 910 may transmit and receive a status message to and from a chatting service providing server 920 over, for example, one or more networks, which may correspond to one or more wired and/or wireless networks. The user terminal 910 may include is at least one display 912, a memory 914, at least one processor 916, at least one program, and an interface 918 to facilitate communications with the chatting service providing server 920.

The at least one program may be configured to be stored in the at least one memory 914, and may be executed by the at least one processor 916. The at least one program may display a status message received from the chatting service providing server 920 via the interface 918, via a friend list page including an area providing a status message of a friend, via the at least one display 912, and the like.

According to exemplary embodiments, when the area providing the status message is selected on the friend list page, the at least one program may be configured to display a one-line message page providing a list of status messages previously input by the friend, and may display a chat room page for chatting with the friend, as well as insert a status message into an input area of the chat room page in a form of a quotation when the status message is selected from among a plurality of status messages provided via the one-line message page.

While only one user terminal is depicted in FIG. 9, the chatting service providing server 920 may be configured to transmit and receive status messages to and from a plurality of user terminals 910. The chatting service providing server 920 may include a receiving unit 922, a control unit 924, and a transmitting unit 926, as well as include at least one memory (not shown). It is also noted that the chatting service providing server 920 may be configured to communicate with one or more local and/or networked repositories (not shown) including information (e.g., settings, etc.) to facilitate provisioning of the status message/chatting service of the one or more service providers.

The control unit 924 may control a status message received from the user terminal 910 through the receiving unit 922 to be transmitted to a corresponding user terminal 910 is through the transmitting unit 926. In exemplary embodiments, the at least one processor 916 and the control unit 924 may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like.

Accordingly, the status message transmitted to the user terminal 910 may be displayed via a friend list page including an area providing a status message of the friend via the display 912 of the corresponding user terminal 910. When the area providing the status message is selected on the friend list page, a one-line message page providing a list of status messages previously input by the friend may be displayed. When one of the plurality of status messages provided on the one-line message page is selected, the selected status message may be displayed in a chat room for chatting with the friend in a form of a quotation.

According to exemplary embodiments, an apparatus and method for providing a chatting service may display a one-line message page providing a list of status messages previously input by a corresponding user when an area providing a status message is selected on a friend list page, and may display a chat room page for chatting with the corresponding user and insert a status message into an input area of the chat room page in a form of a quotation when one of a plurality of status messages provided on the one-line message page is selected, whereby a user may chat about contents of a status message input by another user, in a more convenient, efficient manner.

According to exemplary embodiments, computer-readable media including program instructions configured to implement various operations embodied by a computer may be provided. It is noted that computer-readable media (also referred to as processor-readable is media) includes any non-transitory medium that participates in providing data (e.g., instructions) that may be read by a computer (e.g., by at least one processor of a computer, such as, a portable terminal). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which is typically utilized in association with "main" memories of a computing device. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which at least one processor can read information/instructions.

According to exemplary embodiments, when program instructions are executed by, for instance, at least one processor of a portable terminal including a touch sensing display, one or more instructions embodied in the computer-readable media for instructing the portable terminal to perform a chatting service and/or one or more of the processes described herein may be implemented. In this manner, exemplary programs may be configured via a personal computer-based program or a potable terminal dedicated application, such as, for example, a smart phone application, a feature phone virtual machine (VM) application, and the like. The exemplary programs may be configured to be stored in a memory of a user terminal and to be executed by at least one processor operating the user terminal.

The computer-readable media may be included, alone or in combination, with the program instructions, data files, data structures, and the like. The media and program instructions may be those specially designed and constructed for the purposes of implementing is exemplary embodiments described herein, or they may be of the kind well-known and available to those having skill in the computer software arts. To this end, a file system may be recorded in the computer-readable media to facilitate provisioning of exemplary embodiments.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method, comprising:
    displaying, via a user terminal, a friend list page comprising an area configured to present a status message associated with a friend;
    displaying, in response to selection of the status message, a message page comprising a list of status messages associated with the friend; and
    displaying, in response to selection of at least one of the listed status messages, a chat room page configured to facilitate chatting, the chat room page being displayed comprising the at least one selected status message automatically inserted into an input area of the chat room page.

2. The method of claim 1, wherein the friend list page further comprises an area configured to present profile information associated with the friend, the profile information associated with the friend comprising a nickname and a thumbnail image associated with the friend.

3. The method of claim 2, further comprising:
    displaying, in response to selection of at least some of the profile information associated with the friend, a pop-up page configured to present detailed profile information associated with the friend.

4. The method of claim 3, wherein the pop-up page comprises an area configured to present the status message, the method further comprising:
    displaying, in response to selection of the status message presented via the pop-up page, a chat room page configured to enable chatting, the chat room page being displayed comprising the status message automatically inserted into an input area of the chat room page,
    wherein the detailed profile information associated with the friend comprises the nickname, the thumbnail image, and the status message associated with the friend.

5. The method of claim 1, wherein the status message associated with the friend is a current status message, the method further comprising:
    displaying a speech bubble in the area configured to present the status message associated with the friend, the speech bubble comprising the current status message,
    wherein, if the current status message is larger than a predetermined number of characters, the method further comprising:
        displaying, in a speech bubble, a portion of the current status message and an ellipsis to represent a surplus portion of the current status message.

6. The method of claim 1, further comprising:
    receiving, by the user terminal, an updated status message associated with the friend; and
    changing, in response to receiving the updated status message, a color of the area configured to present the updated status message.

7. The method of claim 1, wherein the message page is displayed by the user terminal as a full-screen pop-up layer, the pop-up layer comprising a page view counter indicating a number of visits to the message page.

8. The method of claim 1, further comprising:
    displaying a user message page associated with a user of the user terminal, the user message page comprising:
        a plurality of status messages associated with the user,
        an edit icon on a side of each of the plurality of status messages associated with the user, and
        an input area configured to enable a status message to be input to the user terminal.

9. A computer-readable storage medium configured to store at least one program comprising instructions that when executed by at least one processor are configured to cause the at least one processor at least to:
    display a friend list page comprising an area configured to present a status message associated with a friend;
    display, in response to selection of the status message, a message page comprising a list of status messages associated with the friend; and
    display, in response to selection of at least one of the listed status messages, a chat room page configured to facilitate chatting, the chat room page being displayed comprising the at least one selected status message automatically inserted into an input area of the chat room page.

10. An apparatus, comprising:
    at least one processor; and
    at least one memory comprising computer code, the at least one memory and the computer code configured to, with the at least one processor, cause the apparatus at least to:
        display a friend list page comprising an area configured to present a status message associated with a friend;
        display, in response to selection of the status message, a message page comprising a list of status messages associated with the friend; and
        display, in response to selection of at least one of the listed status messages, a chat room page configured to facilitate chatting, the chat room page being displayed comprising the at least one selected status message automatically inserted into an input area of the chat room page.

11. The apparatus of claim 10, wherein the friend list page further comprises an area configured to present profile information associated with the friend, the profile information associated with the friend comprising a nickname and a thumbnail image associated with the friend.

12. The apparatus of claim 11, wherein the at least one memory and the computer code are further configured to, with the at least one processor, cause the apparatus at least to:
    display, in response to selection of at least some of the profile information associated with the friend, a pop-up page configured to present detailed profile information associated with the friend.

13. The apparatus of claim 12, wherein the pop-up page comprises an area configured to present the status message, the at least one memory and the computer code being further configured to, with the at least one processor, cause the apparatus at least to:
    display, in response to selection of the status message presented via the pop-up page, a chat room page configured to enable chatting, the chat room page being displayed comprising the status message automatically inserted into an input area of the chat room page, wherein the detailed profile information associated with the friend comprises the nickname, the thumbnail image, and the status message associated with the friend.

14. The apparatus of claim 10, wherein the status message associated with the friend is a current status message, the at least one memory and the computer code being further configured to, with the at least one processor, cause the apparatus at least to:
display a speech bubble in the area configured to present the status message associated with the friend, the speech bubble comprising the current status message,
wherein, if the current status message is larger than a predetermined number of characters, the at least one memory and the computer code being further configured to, with the at least one processor, cause the apparatus at least to:
display, in a speech bubble, a portion of the current status message and an ellipsis to represent a surplus portion of the current status message.

15. The apparatus of claim 10, wherein the at least one memory and the computer code are further configured to, with the at least one processor, cause the apparatus at least to:
receive an updated status message associated with the friend; and
change, in response to reception of the updated status message, a color of the area configured to present the updated status message.

16. The apparatus of claim 10, wherein the message page is displayed as a full-screen pop-up layer, the pop-up layer comprising a page view counter indicating a number of visits to the message page.

17. The apparatus of claim 10, wherein the at least one memory and the computer code are further configured to, with the at least one processor, cause the apparatus at least to:
display a user message page associated with a user of the apparatus, the user message page comprising:
a plurality of status messages associated with the user,
an edit icon on a side of each of the plurality of status messages associated with the user, and
an input area configured to enable a status message to be input to the apparatus.

18. An apparatus, comprising:
at least one processor; and
at least one memory comprising computer code, the at least one memory and the computer code configured to, with the at least one processor, cause the apparatus at least to:
receive a status message associated with a user of a chat service,
determine one or more friends associated with the user, and
transmit the status message to one or more user terminals corresponding to the one or more friends,
wherein the status message is configured to be:
displayed on a friend list page comprising an area configured to present the status message of the user,
displayed, in response to selection of the status message presented via the friend list page, on a message page comprising a list of status messages associated with the user, and
displayed, in response to selection of the status message presented via the message page, in an input area of a chat room page configured to facilitate chatting.

19. The method of claim 1, wherein the at least one selected status message is automatically inserted into the input area as a quotation.

20. The method of claim 1, wherein the message page is a one-line message page.

21. The method of claim 1, wherein the chat room is configured to facilitate chatting between the user and one or more friends, the one or more friends comprising the friend or another friend.

22. The apparatus of claim 10, wherein the at least one selected status message is automatically inserted into the input area as a quotation.

23. The apparatus of claim 10, wherein the message page is a one-line message page.

24. The apparatus of claim 10, wherein the chat room is configured to facilitate chatting between the user and one or more friends, the one or more friends comprising the friend or another friend.

25. The apparatus of claim 18, wherein the chat room is configured to facilitate chatting between the user and one or more friends, the one or more friends comprising the friend or another friend.

26. A method, comprising:
displaying, via a user terminal, a friend list comprising an area configured to present profile information and a status message associated with the friend;
displaying, in response to selection of at least one of the friend in the friend list, a pop-up page configured to present detailed profile information of the friend and the status message associated with the friend; and
displaying, in response to selection of the status message, a chat room page configured to facilitate chatting,
the chat room page that is displayed comprising the selected status message automatically inserted into an input area of the chat room page.

27. The method of claim 26, further comprising:
receiving, by the user terminal, an updated status message associated with the friend; and
changing, in response to receiving the updated status message, a color of the area configured to present the updated status message.

28. The method of claim 26, further comprising:
displaying a user message page associated with a user of the user terminal, the user message page comprising:
a plurality of status messages associated with the user,
an edit icon on a side of each of the plurality of status messages associated with the user, and
an input area configured to enable a status message to be input to the user terminal.

29. The method of claim 26,
wherein the at least one selected status message is automatically inserted into the input area as a quotation.

30. The method of claim 26,
wherein the message page is a one-line message page.

31. The method of claim 26,
wherein the chat room is configured to facilitate chatting between the user and one or more friends, the one or more friends comprising the friend or another friend.

32. A computer-readable storage medium configured to store at least one program comprising instructions that when executed by at least one processor are configured to cause the at least one processor at least to:
display a friend list page comprising an area configured to present profile information and a status message associated with a friend;
display, in response to selection of at least one of the friend in the friend list, a pop-up page configured to present detailed profile information of the friend and the status message associated with the friend; and
display, in response to selection of the status message, a chat room page configured to facilitate chatting, the chat room page that is displayed comprising the selected status message automatically inserted into an input area of the chat room page.

33. The computer-readable storage medium of claim 32, wherein the instructions are further configured to, when executed by at least one processor, cause the at least one processor to:
   receive, by the user terminal, an updated status message associated with the friend; and
   change, in response to receiving the updated status message, a color of the area configured to present the updated status message.

34. The computer-readable storage medium of claim 32, wherein the instructions are further configured to, when executed by at least one processor, cause the at least one processor to:
   display a user message page associated with a user of the user terminal, the user message page comprising:
      a plurality of status messages associated with the user,
      an edit icon on a side of each of the plurality of status messages associated with the user, and
      an input area configured to enable a status message to be input to the user terminal.

35. The computer-readable storage medium of claim 32, wherein the at least one selected status message is automatically inserted into the input area as a quotation.

36. The computer-readable storage medium of claim 32, wherein the message page is a one-line message page.

37. The computer-readable storage medium of claim 32, wherein the chat room is configured to facilitate chatting between the user and one or more friends, the one or more friends comprising the friend or another friend.

38. An apparatus, comprising: at least one processor; and at least one memory comprising computer code, the at least one memory and the computer code configured to, with the at least one processor, cause the apparatus at least to:
   display a friend list page comprising an area configured to present profile information and a status message associated with a friend;
   display, in response to selection of at least one of the friend in the friend list, a pop-up page configured to present detailed profile information of the friend and the status message associated with the friend; and
   display, in response to selection of the status message, a chat room page configured to facilitate chatting,
   the chat room page that is displayed comprising the selected status message automatically inserted into an input area of the chat room page.

39. The apparatus of claim 38, wherein the at least one memory and the computer code are further configured to:
   receive an updated status message associated with the friend; and
   change, in response to receiving the updated status message, a color of the area configured to present the updated status message.

40. The apparatus of claim 38, wherein the at least one memory and the computer code are further configured to:
   display a user message page associated with a user of the user terminal, the user message page comprising:
      a plurality of status messages associated with the user,
      an edit icon on a side of each of the plurality of status messages associated with the user, and
      an input area configured to enable a status message to be input to the user terminal.

41. The apparatus of claim 38,
wherein the at least one selected status message is automatically inserted into the input area as a quotation.

42. The apparatus of claim 38,
wherein the message page is a one-line message page.

43. The apparatus of claim 38,
wherein the chat room is configured to facilitate chatting between the user and one or more friends, the one or more friends comprising the friend or another friend.

\* \* \* \* \*